June 14, 1932.  A. N. JACKSON  1,862,895
PRODUCTION OF RIVETED JOINTS AND IN APPARATUS THEREFOR
Filed July 15, 1929
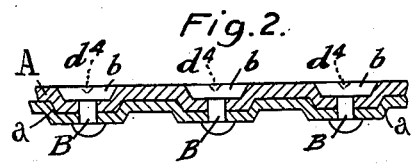
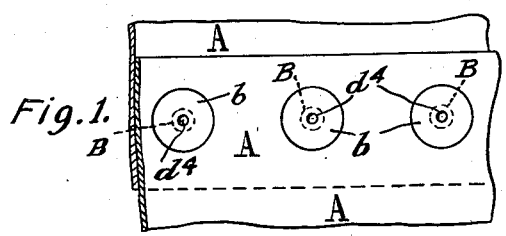
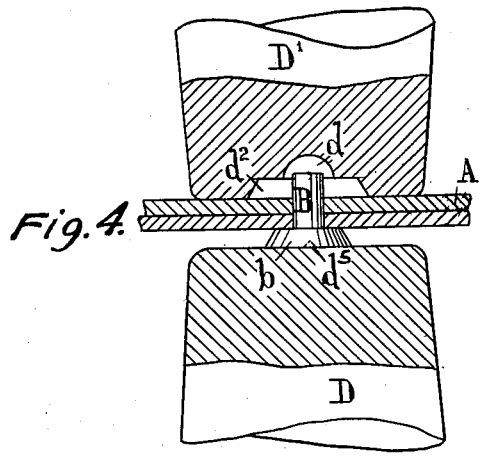
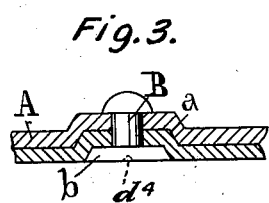
INVENTOR.
Arthur Newton Jackson
by J. Owden O'Brien
atty.

Patented June 14, 1932

1,862,895

UNITED STATES PATENT OFFICE

ARTHUR NEWTON JACKSON, OF MANCHESTER, ENGLAND, ASSIGNOR TO DE BERGUE AND COMPANY LIMITED, OF MANCHESTER, ENGLAND

PRODUCTION OF RIVETED JOINTS AND IN APPARATUS THEREFOR

Application filed July 15, 1929, Serial No. 378,371, and in Great Britain August 1, 1928.

The invention relates to the production or formation of riveted joints in sheet plate, angle or other metal member more particularly applicable for air-craft and similar work in such a way that the shear stress is taken up by the plates and is to a large extent removed from the rivets.

According to the invention a dished like deformation is formed simultaneously in both the plates or members around the joint to be riveted during the operations of riveting, one plate or member being depressed into the other with the rivet in the centre by the pressure of the rivet head between riveting tools, one tool or die being flat on the face and the other formed with a recess in the face complementary to the shape of the rivet head to assist in the deformation of the plates when the pressure is applied and also with a cup to form a head on the reverse end of the rivet shank simultaneously with the deformation of the plates means being provided on the face of the flat die to centre the rivet co-axially with the recess and cup in the face of the other die and the rivet having a preformed flat head with a shoulder adjacent to and at right angles to the shank and inclined bevel edge constituting a flat shouldered countersunk head with bevelled edges.

The invention will be described with reference to the drawing:—

Fig. 1 is a plan of the riveted joint.

Fig. 2 is a longitudinal section through the rivets.

Fig. 3 is a section through the plates and a single rivet (enlarged).

Fig. 4 is a sectional elevation through the plates and rivet and tools or dies for forming the joint.

The plates A to be riveted are drilled or punched with holes to receive the shanks of the rivets B.

The rivets B are each formed with a flat head $b$ with a shoulder adjacent to and at right angles to the shank and with inclined bevel edge constituting a flat shouldered countersunk head with bevelled edges.

The head $b$ of the rivet B is utilized as the tool for forming the depression in or deformation of the plates A. The tool or die D is prepared with a flat face to engage the flat head $b$ of the rivet and the tool or die $D^1$ is formed with a recess $d^2$ complementary with the head $b$ of the rivet and with a cup $d$ concentric therein to receive the end of the rivet shank.

On the flat face of the die D means are provided such as a centering point or pin $d^5$ co-axial with the recess in the die $D^1$ to centre the rivet therewith between the two dies.

In operation the drilled or punched plates A are laid together and the rivets inserted in the holes therein and are passed between the dies the rivets being centered and acted upon in succession. Simultaneously during the operation of riveting by the pressure of the dies D, $D^1$ upon the rivets B the plates A are depressed or deformed by the performed flat head of the rivet B being pressed into one plate on one side and the other plate on the opposite side being forced into the complementary recess $d^2$ in the face of the die $D^1$ a head being formed on the shank of the rivet by the cup $d$ in the centre of the recess $d^2$. The flat head of the rivet B is pressed down level with the surface of the plate forming a flat surface therewith.

The simultaneous operation of riveting and forming complementary depressions in the two plates forcing one into the other and spreading out the shank to form a head on the reverse end of the rivet is carried out in any type of riveting or press machine simultaneously in one stroke of the machine with tools or dies such as described.

What I claim as my invention and desire to protect by Letters Patent is:—

1. A riveting tool for pressing rivets into metal plates to leave the preformed head flush with the surface of the plate comprising two dies, one die formed with a flat face to engage the flat head of the rivet and means on the said flat face to centre the rivet relatively to the other die and the second die formed with a circular recess in the centre substantially larger than the rivet head to receive and depress the plates, a cup shaped aperture concentric with and opening out of the recess to spread out the shank of the rivet and form a new head on the reverse end thereof, the pressing of the plates into the recess and the spreading out of the shank being carried out simultaneously at the same operation.

2. A riveting tool for pressing rivets into metal plates to leave the preformed head flush with the surface of the plate comprising two dies, a circular recess in the centre of one die substantially larger than the rivet head to receive and depress the plates, a cup shaped aperture concentric with and opening out of the recess to spread out the shank of the rivet and form a new head on the reverse end thereof and a point in the centre of the other die co-axial with the centre of the recess in the first die to centre the rivet, the centering of the rivet, the pressing of the plates into the recess, the spreading out of the shank all being carried out simultaneously at the same operation.

In testimony whereof I have hereunto set my hand.

ARTHUR NEWTON JACKSON.